Aug. 11, 1959 W. E. ROGERS 2,899,155
FISHING POLE HOLDER
Filed Jan. 18, 1957

INVENTOR
Willie E. Rogers
BY Francis H. Templeton
ATTORNEY

:::
United States Patent Office 2,899,155
Patented Aug. 11, 1959

2,899,155

FISHING POLE HOLDER

Willie E. Rogers, Oklahoma City, Okla.

Application January 18, 1957, Serial No. 634,895

1 Claim. (Cl. 248—46)

This invention relates generally to mechanical devices for temporarily supporting normally-manually-operated fishing apparatus, and more particularly to such mechanical devices of the type of a fishing pole holder comprising parts which possess advantages of being foldable into compact non-operating position and unfoldable into convenient operative position, adjustable both as to length and angular direction.

Such advantages of this invention are achieved through the carrying out of the inventor's objects, one of which is to provide a minimum of parts, consistent with attainment of desired convenience and adjustability.

The inventor's further object is to insure such minimum of parts being easily and quickly connected and disconnected, in changing from operative to in-operative position, and vice versa.

The inventor's still further object is to provide hinge and extension means to facilitate the changing of the angular direction of the fishing pole and to permit it to be held in desired position.

Various other objects and advantages of this invention will be obvious from the following particular description of embodiments of the invention.

The various features of novelty which characterize my invention are pointed out with particularity in the claim, annexed to and forming a part of this specification, but for a better understanding of the invention, however, its advantages and specific objects obtained with its use, reference should be had to the accompanying drawing and descriptive matter in which I have illustrated and described best forms of invention.

Figure 3:
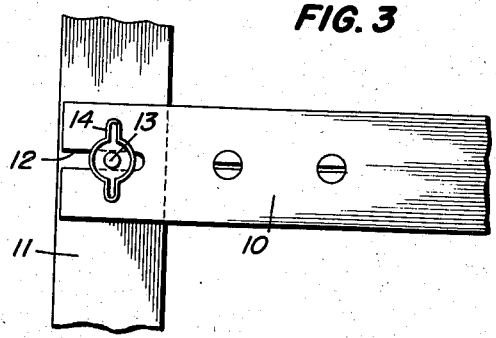
Fig. 3 is a bottom plan view of that portion of the holder indicated by 3—3 in Fig. 2.

Referring to the drawings, a main base 10 is shown attached to a cross arm 11, and for connecting and disconnecting such main base and cross arm, the former has one end provided with a slot 12 extending inwardly a suitable distance, shown in Fig. 3 as slightly less than the width of cross arm 11.

As shown in the drawings, substantially midway of its length and width, the cross arm has a hole bored therethrough, to accommodate a bolt 13 of suitable diameter and length, to extend through such hole in the cross arm and through the slot in the main base, while cooperating with the bolt 13 is the wing nut 14.

At each end of the cross arm (shown integral therewith, but formed separately, if desired, and at any desired angle thereto, though shown at right angles thereto), is a leg 15 preferably reduced to terminate in a point 16, to provide a ground support at each end of the cross arm.

Figure 1:
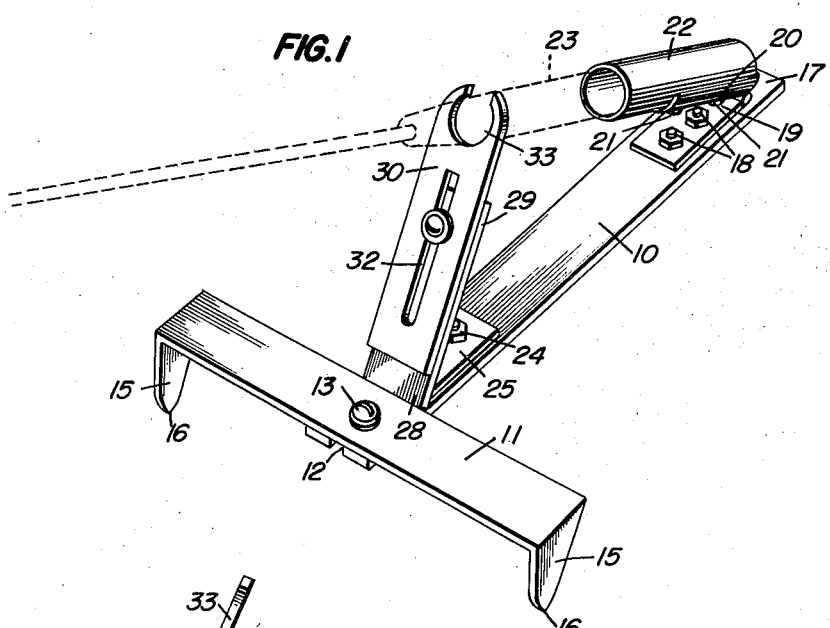
Fig. 1 is a perspective view of one embodiment of my invention of fishing pole holder, with its parts shown in typical position to support a fishing pole (dotted lines).

The main base, at its end 17 (opposite the end attached to cross arm) has attached thereto, by bolts 18, one leaf 19 of a strap hinge, the other leaf of which, indicated by 20, being secured by bolts 21 to the side wall (near one end) of horn 22, which is preferably cylindrical and hollow to receive the handle 23 of a fishing pole, shown in dotted lines in Fig. 1.

To the main base, adjacent to the cross arm connection, is secured, by bolts 24, a leaf 25 of a strap hinge, the other leaf of which being secured by bolts 27 to the lower end 28 of the bottom part 29 of the 2-part pole rest, the top part 30 of which being connected to the bottom part 29 by bolts 31 passing through a hole formed in the bottom part 29 and through a slot 32 formed in top part 30.

The upper end of top part 29 is formed with a slot 33 to receive the appropriate part of the fishing pole beyond that portion of the handle shown set in horn (Fig. 1).

By sliding the bolt 31 in the slot 32, the pole rest's length can be increased or decreased, and the hinge connections of both the pole rest and the horn permit variation in the adjustment of the pole in the support.

In operating the holder, it can be set on the bank of a stream, or the like, with its legs 15 resting on the ground, while a pin or stake of suitable dimensions can be driven through hole 34 formed in the main base, adjacent to the hinging of the horn.

The handle of the fishing pole can be slipped in the horn 22, and the fishing pole (beyond that portion received in the horn) rested in slot 33, while the length of the pole rest can be varied to provide desired angles of elevation of the pole, such insertion and withdrawal of the fishing pole, and variation of angle of the inclination of the fishing pole being accomplished easily and quickly.

Figure 2:
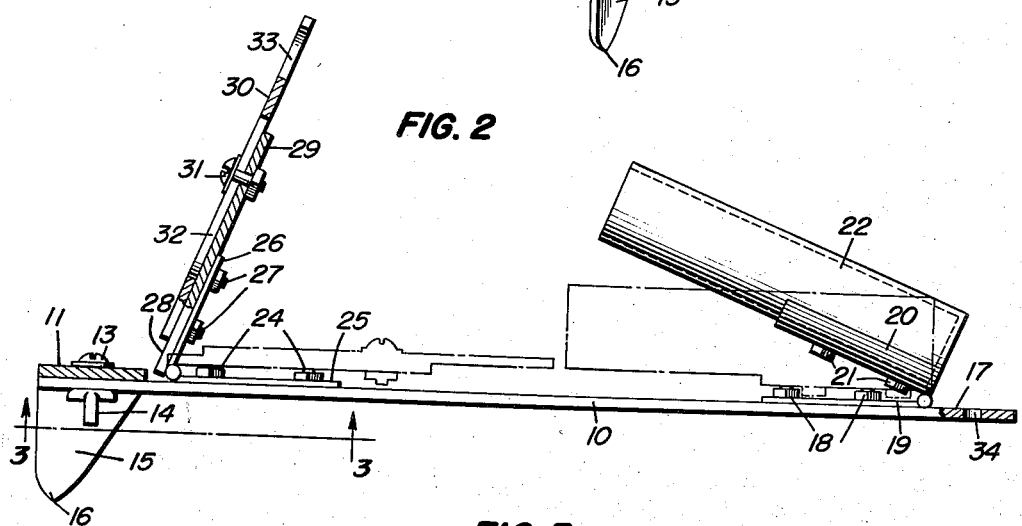
Fig. 2 is a bottom plan view of the construction shown in Fig. 1, but omitting the Fig. 1 dotted line showing of the fishing pole.

Also, when not in use, the base can be readily disconnected from the cross arm, while horn and pole rest can be swung down to put parts away, with the horn and pole rest being of such lengths to permit folding these parts fit against the main base, as shown in broken lines in Fig. 2.

From the foregoing, it will be obvious that I have provided, in a single, convenient and easily-mounted unit, a holder for a fishing pole, permitting variation of angle of inclination, and adapted to be folded into compact inoperative position and to be quickly unfolded into operative position.

While in accordance with the statutes, I have illustrated and described the best embodiments of my invention now known to me, it will be apparent to those skilled in the art that changes may be made in the subject matter and form of the invention disclosed without departing from the spirit of my invention as set forth in the appended claim and that in some cases certain features of my invention can be used to advantage without a corresponding use of other features.

I claim:

A fishing pole holder comprising a main base, a cross arm, a fishing pole rest, and a fishing-pole-handle-receiving horn, said fishing pole rest comprising a lower section and an upper section, the lower end of said lower section being connected by hinge means atop the main base, said hinge means being spaced, by the width of said cross arm, from one end of said main base, said upper section being provided at its upper end with a slot for receiving the fishing pole, said lower and upper sections being connected by pin and slot connection to vary the overall length of said rest and thus vary the angular inclination of the pole supported thereby, said horn being mounted atop the main base by hinge means adjacent the opposite end of the main base from the pole rest, said rest and horn being respectively hinged for swinging, when not in use, toward each other into position against said base, said main base having a slot cut into the end thereof adjacent the rest, a hole formed in said cross arm midway of its length and width, for accommodating a bolt passing through said base slot and through said cross arm hole, to hold said main base and cross arm together when in operative position, and yet permitting the cross arm to be loosened and slipped off in order to make it easier to carry, said main base being straight throughout its length, said cross arm being straight throughout its length except for short legs extending at right angles thereto at opposite ends thereof, for engaging the ground to support the device in desired position, said cross arm having an overall length substantially equal to the distance between the point of hinging of the rest and the point of hinging of the horn on the main base, to provide stability against lateral overturn of the fishing pole in supported position.

References Cited in the file of this patent

UNITED STATES PATENTS

| | | |
|---|---|---|
| 1,773,237 | Naujoks et al. | Aug. 19, 1930 |
| 1,891,163 | Kabele | Dec. 13, 1932 |
| 2,783,009 | Petterson | Feb. 26, 1957 |